June 21, 1966
H. W. BOTELER
3,257,097
DIAPHRAGM VALVE
Filed May 6, 1963
4 Sheets-Sheet 1
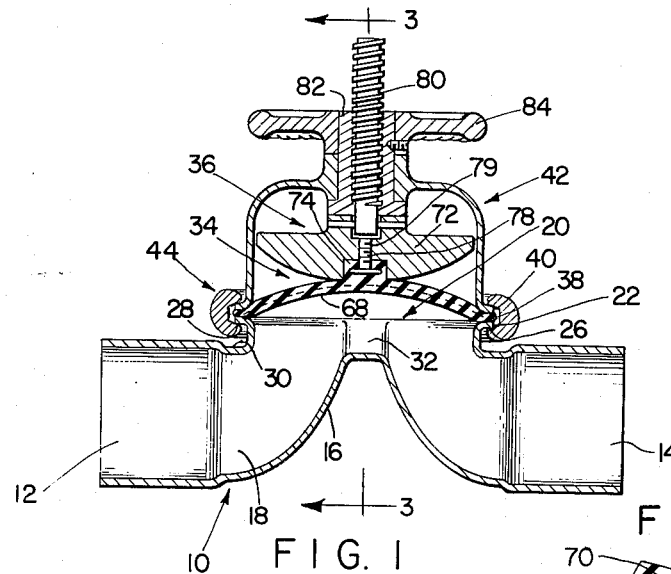
FIG. 1
FIG. 1D
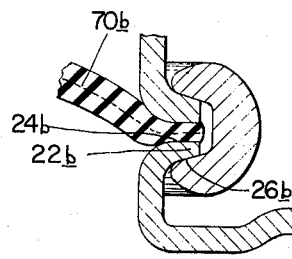
FIG. 1B
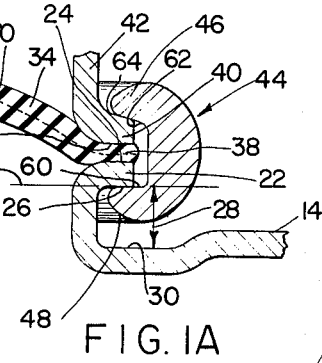
FIG. 1A
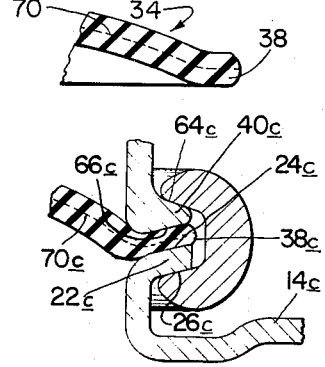
FIG. 1C
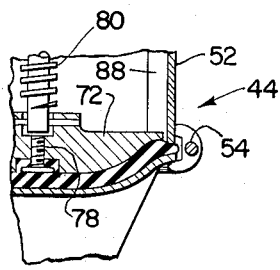
FIG. 13
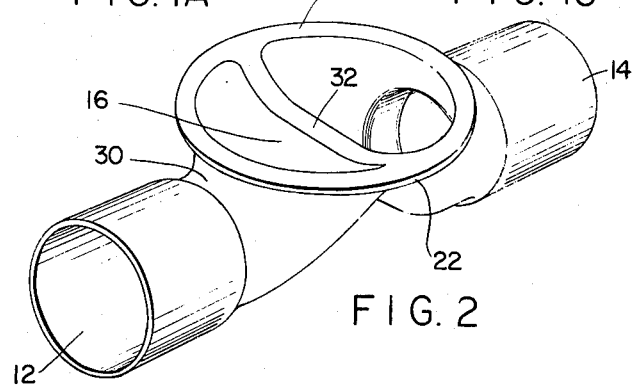
FIG. 2
INVENTOR.
HENRY W. BOTELER
BY David D. McKenney
ATTORNEY

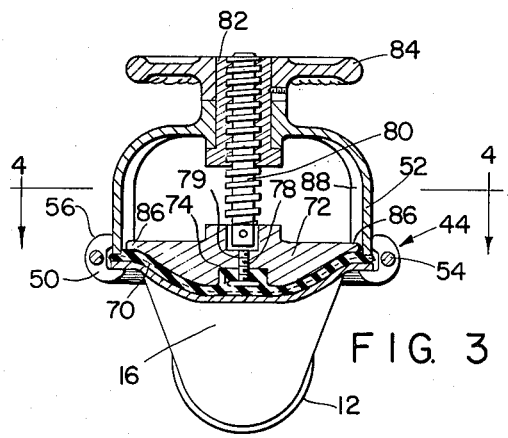
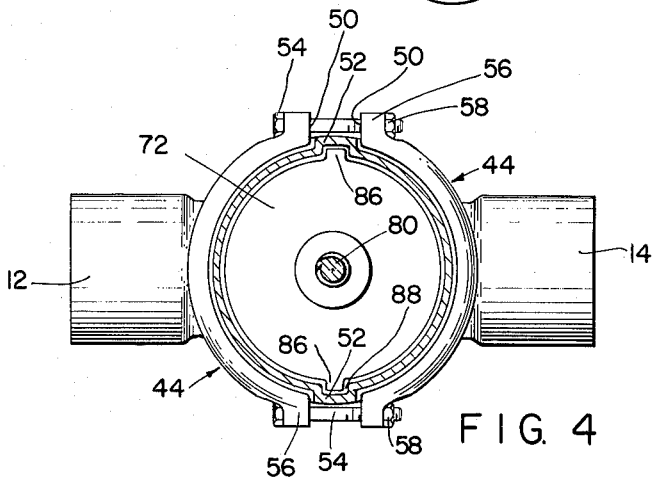
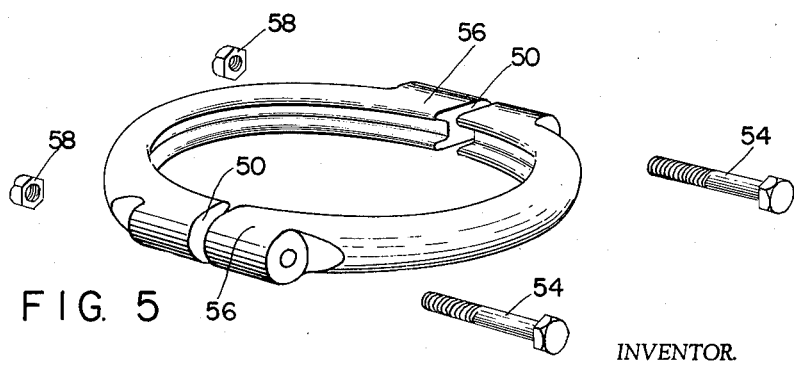

June 21, 1966  H. W. BOTELER  3,257,097
DIAPHRAGM VALVE

Filed May 6, 1963  4 Sheets-Sheet 3

INVENTOR.
HENRY W. BOTELER
BY David D. McKenney
ATTORNEY

June 21, 1966  H. W. BOTELER  3,257,097
DIAPHRAGM VALVE

Filed May 6, 1963  4 Sheets-Sheet 4

INVENTOR.
HENRY W. BOTELER.
BY David D. McKenney
ATTORNEY

3,257,097
DIAPHRAGM VALVE
Henry W. Boteler, East Greenwich, R.I., assignor to Grinnell Corporation, Providence, R.I., a corporation of Delaware
Filed May 6, 1963, Ser. No. 278,028
3 Claims. (Cl. 251—331)

This invention relates to improvements in valve bodies of the type used, for example, in diaphragm valves. More particularly, it has to do with a valve body which is in the form of a container having a flow passage therethrough, having a closure member opening in one side thereof and having a novel flange around said opening.

There are in use today a number of different valve bodies of the general type used in diaphragm valves. One of the most common of these is the body in which the flow passageway is in a run portion, in which the closure member opening is at the end of a short side branch portion and in which the flow passageway is intercepted by a high transverse weir rising toward the opening from the side of the passageway opposite this branch portion. Other bodies of this type include those having lower weirs, or, in some instances, substantially no weirs at all.

One feature which these bodies have in common is a flange around the closure member opening. Another common feature is the location of this flange in a plane which is parallel to and spaced a short distance from a second plane which is tangent to the external surface of the run portion on the side thereof adjacent said opening. Still another common feature is a soft sealing member clamped between the above flange and a corresponding flange on the bonnet which covers the closure member opening and which houses the actuating mechanism. In the case of a diaphragm valve this soft sealing member is the peripheral portion of a diaphragm closure member which achieves valve closure by having its central domed portion moved (by the actuating mechanism) toward and into engagement with a seating on the body opposite the opening. In other cases this sealing member is a gasket separate from a soft plug or gate which constitutes the closure member and which achieves closure by being moved toward and into engagement with a seating located on the body opposite the opening.

Conventionally these valve bodies have been formed of cast metal such as cast iron, cast bronze, cast aluminum and cast steel, or they have been molded from plastic such as polyvinylchloride, polytetrafluoroethylene, or the like. As a consequence of such formation the valve bodies of this general design have been influenced by the requirements of, and the opportunities afforded by, metal casting and plastic molding techniques. For example, such bodies have often been designed with widely varying thicknesses in the side walls of the flow passageway. This is usually done to simplify the exterior shape of the valve body, which shape would be quite complex if the exterior surfaces were made to correspond closely to the interior surfaces, and it is no more difficult in casting and molding to make such surfaces non-parallel. Similarly, such bodies have usually been designed with closure member opening flanges having a thickness which is considerably greater than the thickness of the passageway walls and which blend into the passageway walls, or they have been designed with closure member opening flanges which have considerable width, or they have been designed with flanges which have both considerable thickness and considerable width. Substantial width in these flanges has been useful to provide rigidity in this part of the body (which might otherwise lack such rigidity here because of the large closure member opening) and to provide projecting body portions to which the bonnet can be secured. Substantial thickness in these flanges has further increased rigidity and has enabled the smooth blending of the flange with the walls of the passageway and thereby avoid crevices and undercuts which are more difficult to cast or mold.

However, despite the suitability of casting and molding for making valve bodies with wide, thick and blended flanges, there have always been serious problems inherent in the formation of valve bodies by these established techniques. For example, in the case of cast steel valve bodies voids and porosity are common and when they occur on the interior surfaces, may require extensive hand grinding and hand repair welding. In the case of ordinary cast iron valve bodies the frequently required application of glass lining is made difficult by the glass generated from the surface of the cast metal during the lining process. In the case of valve bodies of these or any other cast metals relatively heavy wall thicknesses are common to provide sufficient strength and to allow for slight pattern and core shifts. The result of these heavy wall thicknesses is a relatively massive valve. In the case of the molded plastics there are limits of strength and heat resistance inherent in these materials which make them less suitable than metal for many applications even though they are generally lighter in weight and often have high corrosion resistance properties.

One of the repeatedly attempted solutions of these casting and molding problems has involved the attempted fabrication of this kind of valve body from stock metal shapes that have been rolled or extruded, for example from pieces of pipe, sheet or plate. The objective of these attempts has been to obtain the advantages of metal as the primary valve body material while avoiding the cast metal problems outlined above.

These attempts have, quite naturally, been directed to valve body designs which are substantially the same as the cast metal and molded plastic designs above described. More particularly, they have involved forming pipe or plate sections and fastening them together, usually by welding, to provide bodies with wide or thick or wide and thick opening flanges. In some cases this fabrication has required a great deal of welding because the body is formed of a large number of pieces. In other cases, and particularly in the more recent attempts, there has been less welding, and it has even been proposed that most of this be done with automatic welding equipment, but in all the known cases there have been some welds in the passageways or around the closure member openings or both, and these welds have constituted a significant part of the total cost of the prior art valve bodies. Nor is it just the welding itself. The subsequent machining of the weld to make it smooth accounts for a relatively large part of the welding expense.

The present invention arises from an appreciation and discovery that much of the welding which has appeared in the passageways or around the closure member openings of the earlier fabricated valve bodies is primarily required in order to provide a massive flange around the closure member opening. Applicant has discovered and realized that where weight and size reduction is important and where the passageway walls are therefor of substantially uniform thickness, considerable weight can be saved and bulkiness avoided by making the opening flange very narrow and relatively thin and by forming it on the extended end of a short branch portion so that the underside of the flange is spaced from the exterior surface of the nearest (and generally cylindrical) run portion. Such a flange permits the use of a novel clamp (which will be described hereinafter) for squeezing the sealing member between the body and bonnet flanges, for mounting the bonnet on the body and for providing rigidity to the entire valve structure.

One advantage of the present invention is that it provides a closure member opening flange which is compatible with a substantially uniform wall thickness. In general valve bodies with such uniform wall thickness are those in which light weight and small size are important, and this invention greatly contributes to a reduction of weight and bulkiness. In the case of valve bodies which have both the run and branch portions formed from single pieces of pipe or tubing this feature is especially valuable because the thin and narrow flange can be formed integrally from the same pieces.

Thus, while it is true that metal forming techniques have advanced to the point where very intricate shapes can be produced and metal can be moved substantial distances inside of forming dies, there is a practical limit to the extent to which radially extending flanges can be easily drawn from a piece of pipe or tubing, particularly when these flanges are formed on the ends of short branch portions which are themselves drawn from the piece of pipe or tubing.

In view of the novel clamping arrangement referred to which has been developed for securing a valve bonnet to the body flange and for giving the necessary rigidity to the valve structure, another advantage of the invention is the provision of a body flange which will flex slightly under the application of non-uniform clamping pressure. Thus, this clamping arrangement involves a U-shaped band embracing both the under surface of the body flange and the upper surface of a bonnet flange and thereby holding the body flange's upper clamping surface firmly against the sealing member which is thereby squeezed against the under surface of the bonnet flange. To achieve this engagement the band is preferably segmented and because of this, as well as for other reasons, uniform holding pressure cannot be expected at all points around the body flange. However, because of the narrowness and thinness of the body flange these non-uniformities are minimized through slight flexing of the body flange which is possible because of the soft material of the sealing member and which permits an extensive engagement of the band against the under surface of the body flange. Despite this flexibility the rigidity of the overall body-to-bonnet joint is completely adequate for withstanding harmful body distortion during closing.

In view of the foregoing one of the features of the present invention is that a body having substantially uniform thickness throughout (in the run portion, branch portion and opening flange) can at the same time, and because of the particular shape discovered, have a flange which is flexible enough to distort slightly during clamping and at the same time have branch and run portions which are rigid enough to withstand distortion during valve closure.

As has been mentioned, the present invention is directed primarily toward those valve bodies which have substantially uniform passageway wall thicknesses. The reason for this is that the novel opening flanges of this invention are of such size and shape that each one can be formed integrally with the body when the latter is formed from a single piece of pipe or tubing. This permits a great saving in manufacturing expense because a separate closure member opening flange need not be secured to the piece of pipe or tubing. At the same time, because pipe or tubing is used, the wall thicknesses of the passageway are substantially uniform.

Accordingly, in the most preferred form of the invention the novel flange is on a body having branch walls of substantially uniform thickness, and this novel flange cooperates with the branch walls by having substantially parallel upper and under surfaces which blend smoothly into the branch walls.

On the other hand the invention is not limited to valve bodies formed from pipe or tubing or to bodies formed from one piece of material, because in one of its embodiments this invention involves a closure member opening flange which is flexible, as set forth earlier, a feature that does not depend on the dimensions of the remainder of the body or on the shape of the material from which the body is formed.

With respect to the preferred embodiments in which the novel features of the flange are definable with relation to the thicknesses of the walls of the branch and run portions, a thin opening flange should be understood to mean a flange having substantially the same thickness as the passageway walls, which are, in turn, substantially uniformly thick throughout.

Likewise with respect to such preferred embodiments, a "narrow" opening flange should be understood to mean a flange having an outer edge which closely follows the shape of the closure member opening, which has no substantial projections radially outward therefrom, which has an annular clamping surface between the closure member opening and the outer edge, and in which the radial distance from the closure member opening to the outer edge nowhere exceeds three times the thickness of the passageway walls which are, in turn, substantially uniformly thick throughout.

It has been found that when the closure member opening flanges have their dimension within these limits the valve body is surprisingly compact and light and lends itself particularly well to construction from one piece of metal pipe or tubing by relatively simple metal forming techniques. At the same time, body opening flanges within these limits permit the use of novel clamping arrangements without unduly increasing the distance between the flange clamping surface and the axis of the flow passageway at the ends of the valve.

Accordingly it is an object of the present invention to provide a valve body with a novel flexible flange around the opening in the end of a short branch portion.

Another object is to provide a valve body formed in a single integral piece (except perhaps for any special end connections), which has passageway walls of substantially uniform thickness, and which includes a narrow flange around the closure member opening.

Another object is to provide a valve body of the kind described in which the outer edges of the flange are substantially circular.

Another object is to provide a valve body of the kind described in which the flange has no lugs extending radially outwardly beyond said circular outer edge.

Another object is to provide a valve body of the kind described in which the flange has a flat annular clamping surface between the closure member opening and its outer edge.

Another object is to provide a valve body of the kind described wherein the under side of the flange is in a first plane which is spaced from a second parallel plane tangent to the nearest exterior surfaces of both the end portions.

Another object is to provide a valve body which is relatively light in weight and small in size and which lends itself to quick valve assembly and disassembly.

Another object is to provide a valve body which is easy to manufacture by forming from a piece of pipe or tubing.

Other objects will appear hereinafter.

The best modes in which I have contemplated applying the principles of my improvements are shown in the accompanying drawings, but these are to be deemed merely illustrative for it is intended that the patent shall cover by suitable expression in the appended claims whatever features of patentable novelty reside in the invention disclosed.

In the drawings:

FIGURE 1 is a cross-sectioned side elevation view of a weir-type diaphragm valve body according to the present invention, this body being shown in a completed valve shown in the open position;

FIGURE 1A is a cross-sectioned fragmentary view of a portion of FIG. 1 the diaphragm edge clamped between the body and bonnet, the view being enlarged to better show the shapes of the body and bonnet flanges and of the clamping device;

FIGURE 1B is a view like FIG. 1A, but showing a set of slightly different shapes for the body and bonnet flanges;

FIGURE 1C is also a view like FIG. 1A, but showing still another set of slightly different shapes for the body and bonnet flanges;

FIGURE 1D is a fragmentary cross section view showing the shape of the edge of the diaphragm used in FIG. 1 prior to clamping;

FIGURE 2 is a perspective view of the body shown in FIG. 1;

FIGURE 3 is a cross-sectioned end view taken on line 3—3 of FIG. 1 but showing the valve in closed position;

FIGURE 4 is a cross-sectioned plan view taken on line 4—4 of FIG. 1;

FIGURE 5 is a perspective view of the clamping device used in FIGS. 1, 3 and 4;

FIGURE 13 is a view like FIG. 3, but showing the FIG. 1C embodiment.

Figure 6:
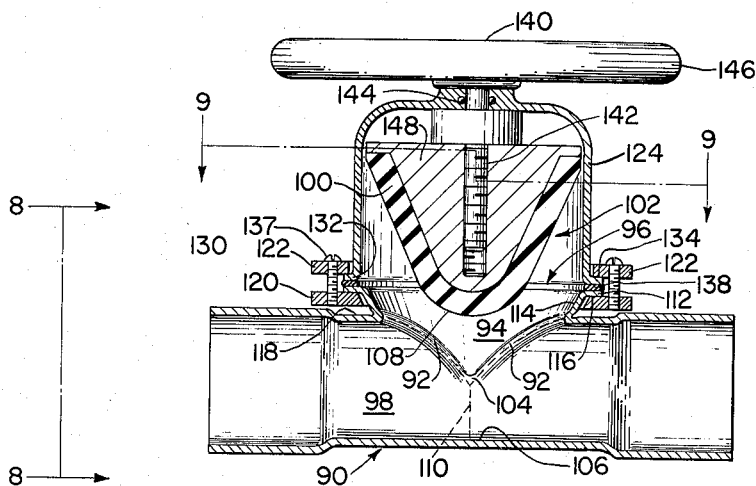
FIGURE 6 is a view like FIG. 1 but showing a gate-type valve having a body in accordance with the present invention and showing a different type of clamping device.

Referring now more particularly to the drawings, FIG. 1 shows a weir-type diaphragm valve having a body 10 with female end connections 12 and 14 of the socket type and with a weir 16 extending from one side of the flow passageway 18 toward a diaphragm opening 20 on the opposite side. This opening is substantially circular and has therearound a thin narrow flange 22 with an outwardly presented annular clamping surface 24. In addition, this opening 20 is located so that the underside 26 of the flange 22 is spaced a substantial distance 28 from the region 30 on the exterior surface of the cylindrical end portions between the opening 20 and the end connections. The purpose of this distance will appear later herein.

The weir 16 is so formed that the surface 32 which forms the seat for the diaphragm 34 extends across the opening 20 from the flange on one side to the flange on the opposite side.

This weir surface 32 is concave and the central portion of the diaphragm is domed so that a flow aperture is established over this weir when the diaphragm is held by the actuating mechanism 36 in the position shown in FIG. 1. More particularly, the peripheral portion 38 of the diaphragm is sealingly clamped against the body flange surface 24 by a corresponding flange 40 on a bonnet 42 which houses this actuating mechanism. The body and bonnet flanges are drawn together by a clamp 44 which is formed from two curved strap sections each of which has a generally U-shaped cross section, the diverging legs 46 and 48 of the U being spaced apart so that they embrace between them the body and bonnet flanges and the diaphragm periphery.

FIGS. 3 and 4 show how the two strap sections are drawn together by bolt and nut assemblies on opposite sides of the valve. Preferably the ends 50 of the strap sections lie on opposite sides of rib 52 which extends down the side of the bonnet and the purpose of which will be explained hereinafter. A bolt 54 passing through tabs 56 on the strap ends and across the rib 52 is provided with a nut 58 which draws the strap ends toward each other. This squeezes the body and bonnet flanges together and provides a fluid tight seal between the body flange surface 24 and the diaphragm peripheral portion 38. The squeezing action is obtained because the legs 46 and 48 of the strap cross section diverge from the base of the U-shape. Accordingly, as the straps are drawn toward each other the body and bonnet flanges are wedged into the converging groove between the legs 46 and 48. This wedging action results even though the inner surface 60 of leg 48 lies in a flat plane 61. It is enough that there is convergence between this surface 60 and the inner surface 62 of leg 46.

It is preferred that the strap leg surface 60 lie in a flat plane because it engages the undersurface 26 of body flange 22, and in the embodiment of FIGS. 1, 3 and 4 this flange has substantially flat parallel surfaces. Furthermore, in FIG. 1 the body flange is relatively thin so that it is advisable to have as wide an engagement as possible with the inner leg surface 60 to obtain maximum support, and this further necessitates the leg surface 60 being in a flat plane, as shown. It is left to the corresponding inner surface 62 of the other leg 46 to provide the convergence required for clamping.

To enable the body of the valve of FIGS. 1, 3 and 4 to be constructed from one piece of relatively thin walled pipe or tubing, the flange 22 is made to have substantially the same thickness as the remainder of the body walls, and in this embodiment the surfaces 24 and 26 of this flange are substantially parallel. A body of this shape has definite advantages, particularly the ease with which it can be formed of dense metal in rolled or extruded shapes. Such dense metals, in contrast to the porous cast metals, provide better flow passageway surfaces.

The character of the metal in the bonnet is not so important, and the desirability of having the bonnet flange surface 64 conform to the clamping leg surface 62 results in this bonnet flange being formed with non-parallel flange sides. For example, it might be convenient to make the bonnet of cast metal. The underside 66 of the bonnet flange lies in a flat plane so that there will be substantial engagement with the diaphragm peripheral portion which, in FIGS. 1, 3 and 4, is molded with flat parallel surfaces. (See FIG. 1D.) Because the bonnet is a casting this varying thickness in the bonnet flange is easy to achieve. A varying thickness of this kind could also be achieved by forming techniques, but a cast bonnet is completely adequate in most applications and is normally less expensive than a formed bonnet.

One of the features of the construction of FIGS. 1, 3 and 4 is the slight flexibility or deformability of the body flange 22. From the description thus far it will be understood that the clamping arrangement, although capable of exerting uniform clamping pressure when drawn into its final position, will squeeze different parts of the flanges with different forces while the clamp is being made up to final circular form and even after the clamp is fully made up if there are irregularities in the dimensions or if the straps do not finally form an exact circle. By having a relatively thin body flange 22 unequal squeezing results in the flange deforming slightly and permitting full engagement of the underside of the body flange by the clamping leg 48. If the body flange is rigid the advantage of the continuous clamping is lost since exact fit is unlikely and the application of force at only one or two locations requires the distribution of this force to all parts of the diaphragm periphery by the rigid body flange acting as a beam. This is the same type of clamping which is so familiar in prior devices employing extended flanges bolted together at spaced points. In those prior devices the squeezing exerted by the bolts is distributed by the beam action of the body flange which has always been rigid enough to do this job. In the present invention, however, the rigidity of the joint is derived principally from the relatively heavy clamp, and by having a flexible body flange uniform squeezing at circumferential points is assured.

The central portion 68 of the diaphragm 34 is domed in the position shown in FIG. 1 when this diaphragm is molded. However, the diaphragm material is customarily rubber or rubber-like so that this central portion can be flexed to the shape shown in FIG. 3. This closes the valve. The diaphragm usually has an embedded fabric layer 70 to provide strength against bursting from the pressure of the fluid in the valve. This fabric does not hinder the flexibility of the diaphragm central portion 68.

The reversal of the diaphragm central portion is achieved by a compressor 72, having its underside provided with a recess which receives an upstanding integral boss 74 on the diaphragm in which the head of a stud 78 is embedded. The threaded shank of this stud extends from the boss to be screwed into a correspondingly threaded hole 79 in the bottom of the recess. The compressor is pivotally connected to the lower end of a threaded spindle 80 which is mounted in a threaded bushing 82 rotatedly journalled in an opening in the top of the bonnet. The bushing extends out of the bonnet and has secured to it a handwheel 84.

Operation of the valve is as follows: Rotation of the handwheel 84 rotates the bushing 82. Spindle 80 is prevented from rotating by a pair of projecting arms 86 on the compressor which slidingly fit into a pair of opposite vertical grooves 88 provided on the inner surface of the bonnet by the ribs 52. As a result rotation of the handwheel in one direction causes the spindle to move vertically (assume the motion is downward from the position shown in FIG. 1) to cause the compressor 72 to press the domed diaphragm portion 68 toward and into firm seating engagement with the weir surface 32. This closes the valve. Conversely if the handwheel is turned in the opposite direction the compressor and spindle are raised and the diaphragm is again moved to the position shown in FIG. 1.

When the valve is tightly closed in the manner above described considerable force is exerted by the compressor against the weir tending to separate bonnet and body. This force is resisted by the clamp 44 and is in addition to the clamping force which is introduced when the valve is assembled. Even though the body is of relatively light wall construction and even though the body flange is no heavier than the remainder of the body, the continuous clamping arrangement shown, the rigidity afforded by the bends in the metal in the region of the opening flange and the rigidity afforded by the clamp itself provide ample strength to prevent the kind of distortion of the weir which would permit leakage.

FIGURE 1A shows an enlarged fragment of the clamping arrangement of FIG. 1.

FIGURE 1B shows in enlarged fragment a slightly different clamping arrangement. The body flange 22b has a sloped underside 26b, although the clamping surface 24b is in a flat plane. The advantage of this is that there is a greater amount of squeeze on the diaphragm periphery for a given amount of drawing together of the clamping straps. When the body is drawn from a single piece of pipe or tubing the tapered body flange 22b is somewhat more difficult to form than a flange of uniform thickness of FIG. 1, but the advantage of the double taper may outweigh this difficulty in some cases. Casting a body with such a tapered flange is possible, but thin-walled castings are relatively difficult to make, and even when they are achieved a great deal of the advantage made possible by the invention is lost because of the cast metal porosity.

To avoid making a tapered body flange but at the same time employ the double sloped surfaces of the body and surfaces of the body and bonnet flanges the arrangement of FIG. 1C may be employed. In this case the body flange 22c has a sloped underside 26c and a similarly sloped clamping surface 24c so that the body flange is uniformly thick. If the diaphragm periphery 38c is to have uniform thickness, as has usually been the case, a bonnet flange 40c with oppositely sloping sides 64c and 66c would be required. This construction would be no problem when the bonnet is made of cast metal. The arrangement of FIG. 1C does alter the appearance of the seating somewhat as is demonstrated in FIG. 13 because the diaphragm peripheral portion is no longer in a flat plane. However, except for the necessity of molding the diaphragm in this shape or of deforming it into this shape during valve assembly, the sloped diaphragm peripheral portions present no problem.

FIG. 6 shows how the features of the present invention can be embodied in a valve of the gate type and further shows that a different clamping arrangement can be used. In this embodiment the valve body 90 is like that of FIG. 1 except that instead of a weir it has seating ribs 92 raised slightly from the side walls 94 which form a transition from the opening 96 to the generally cylindrical passageway at 98. These ribs provide clearly defined seating areas for the relatively soft material 100 on the gate 102 in those regions where a wide area contact between the gate and body side walls 94 would otherwise occur. The seating line for each side of the opening follows ribs 92 around the top of the passage and down similar ribs on the other side. Though the ribs end at 104 on the sides of the passageway the seating continues across the bottom 106 of the passageway where ribs are not necessary (because the contact between the rounded end 108 of the end and the cylindrical passageway amounts to a relatively narrow line contact like that produced by the ribs higher up). The dotted lines 110 in FIG. 6 follow the path of the above described seating.

The body opening 96 in FIG. 6 is surrounded by a thin, narrow flange 112 like that in FIG. 1, with the difference that a portion 114 of the inner surface which is turning out toward the flange must be wide enough for the ribs 92. As in the case of FIGS. 1, 1B and 1C, the flange 112 has its underside 116 spaced sufficiently far from the surface 118 to permit a rigid split ring 120 to be inserted under the flange 112 and engage its underside 116.

This ring is part of another style of clamping arrangement which can be used with the valve bodies of the present invention. The ring 120 is in two parts each of which is adapted to slip under the body flange 112, and each of which has devices for securing it to a full ring 122 associated with the bonnet 124. Preferably these devices are lugs 126 with threaded openings 128 which are radially outward beyond the edge 130 of the body flange 112. Preferably there are at least three such lugs for each part of ring 120, one lug at each end of the part and one in the middle. In FIG. 6 the splits in ring 120 are at the sides of the body but it will be understood that the splits could be located as desired. Also the ring 120 could be divided into some other convenient number of parts and the splits located as desired around the opening.

The bonnet in FIG. 6 is like that shown in FIG. 1 except that the bonnet flange 132 need not have any taper on its upper surface 134. The reason for this is that this surface is engaged by the full ring 122 which fits loosely down over the bonnet and has apertured lugs 136 matching the lugs 126 when the split ring 120 is in place. The body and bonnet flanges are drawn together to seal the bonnet to the body by bolts 137 in the appropriate lugs. By having three bolts for each split ring part this part is prevented from tipping or being cocked out of position when the bolts are tightened.

A sealing gasket 138 of soft material provides the joint between the body and bonnet flanges, and here as in FIG. 1, the deformability of the relatively thin body flange 112 produces a good seal without the necessity for rigidity in the body flange itself.

Since there is no diaphragm in this FIG. 6 embodiment the fluid being handled by the valve can enter the bonnet. Accordingly, the aperture 140 for the spindle 142 is provided with an O-ring seal 144. This spindle carries the handwheel 146 outside the bonnet and is threaded into a metal core 148 of the gate 102. Because the bonnet is provided with ribs 150 which accommodate internal grooves 152 the gate 102 is prevented from rotating by projections 154 on the metal core 148. These projects slide vertically in the grooves 152. Accordingly, when the handwheel is turned the gate moves up or down as the case may be.

Figure 8:
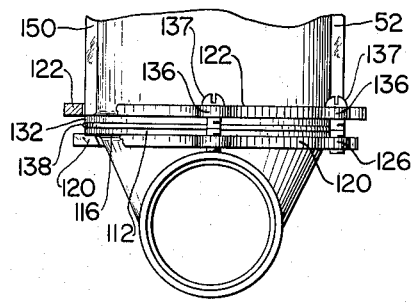
FIGURE 8 is an end view taken on line 8—8 of FIG. 6.
Figure 7:
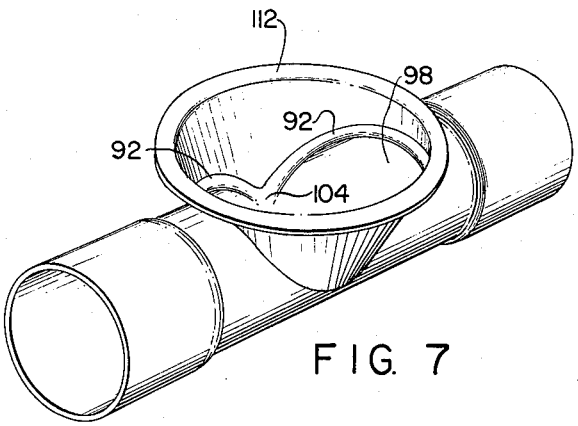
FIGURE 7 is a perspective view of the body shown in the valve of FIG. 6.
Figure 8A:
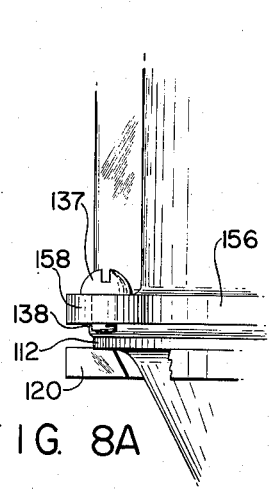
FIGURE 8A is a fragmentary view of a portion of the diaphragm edge clamped between a body like that of FIG. 8 and a bonnet having a large flange, the clamping arrangement being a modified form of that shown in FIG. 8.
Figure 9:
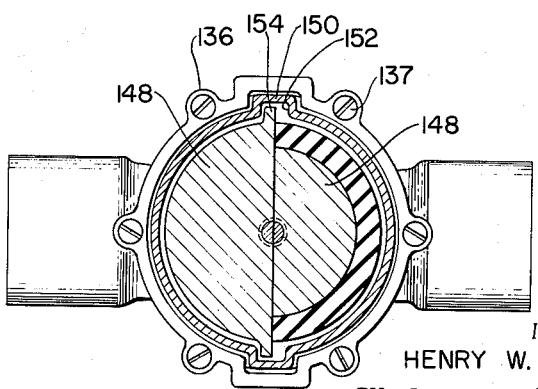
FIGURE 9 is a cross-sectioned plan view taken on line 9—9 of FIG. 6.
Figure 10:
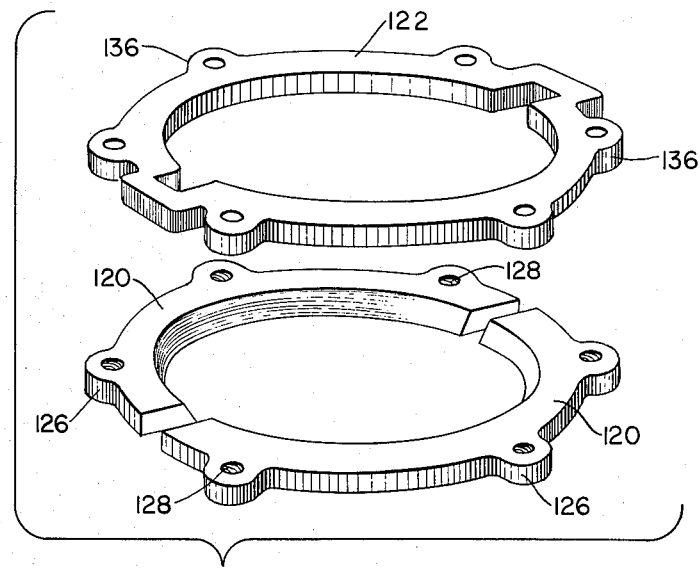
FIGURE 10 is a perspective view of the clamping device used in FIGS. 6, 8 and 9.

FIG. 8A shows a bonnet in which an integral flange 156 on the bonnet forms the function of the ring 122 in FIG. 8. This flange is provided with lugs 158 which receive the bolts 137. Otherwise the arrangement in FIG. 8A is like that in FIGS. 6, 7, 8 and 9 and like numbers designate like parts.

Figures 11, 12:
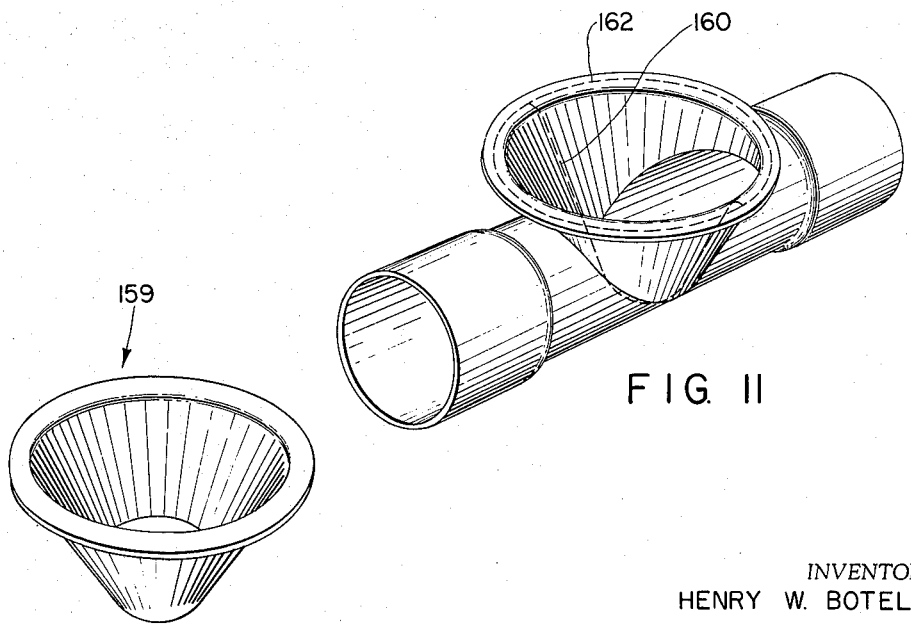
FIGURE 11 is a perspective view of a weir-less type diaphragm valve body according to the present invention.
FIGURE 12 is a perspective view of the diaphragm which would be used in a body like the one shown in FIG. 11.

FIG. 11 shows still another valve body style which is suitable for this invention. It is like the body shown in FIG. 7 except that it is particularly designed for a diaphragm closure member 159 as shown in FIG. 12, and the line of seating when the diaphragm is in closed position is indicated by the dotted line 160. The dotted line 162 shows the region of clamping of the diaphragm periphery.

What I claim is:
1. For a diaphragm valve having:
  (I) a bonnet which:
    (A) has a clamping surface on one end,
    (B) houses an actuating mechanism,
  (II) a diaphragm which:
    (A) is secured to said actuating mechanism,
    (B) overlies said bonnet clamping surface,
  (III) a clamping assembly which:
    (A) engages said bonnet,
    (B) has a surface which:
      (1) is spaced from said diaphragm,
      (2) is presented toward said bonnet clamping surface,
    (C) has means for drawing said clamping assembly surface toward said bonnet clamping surface,
a body comprising:
  (IV) a container having:
    (A) a pair of end portions having:
      (1) end openings,
      (2) wall which:
        (a) are of substantially the same uniform thickness throughout,
        (b) have exterior surfaces,
        (c) have interior surfaces defining a flow passage extending between said end openings,
    (B) a side portion having:
      (1) a diaphragm opening adapted to be presented toward said bonnet,
      (2) walls which:
        (a) join said end portion walls,
        (b) are of substantially the same said uniform thickness throughout,
        (c) have interior surfaces defining a diaphragm passage which:
          (i) has an axis,
          (ii) extends from said diaphragm opening to said flow passage,
  (C) a flange which:
    (1) surrounds said side portion diaphragm opening,
    (2) has a thickness which is at least no greater than said same uniform thickness,
    (3) has a first surface which:
      (a) is adapted to be presented toward said bonnet clamping surface when said side portion diaphragm opening is presented toward said bonnet,
      (b) lies in a plane which is at substantially right angles to said diaphragm passage axis,
      (c) is free of recessed portions,
    (4) has a second surface which:
      (a) is opposite said first flange surface,
      (b) is spaced from said end portion exterior wall surfaces,
      (c) is adapted to be engaged by said clamping assembly surface,
    (5) has a third surface which:
      (a) forms the edge of said flange,
      (b) is spaced from said diaphragm opening a distance which:
        (i) is measured: (o) in said plane, (oo) radially with respect to said diaphragm passage axis,
        (ii) is substantially everywhere less than three times said same uniform thickness,
    (6) is free from reinforcements,
    (7) is readily deformable:
      (a) by said clamping assembly drawing means,
      (b) to conform said second flange surface to said clamping assembly surface,
whereby the clamping forces exerted by said clamping assembly on said flange deform said flange and are thereby distributed substantially uniformly along said flange.

2. A diaphragm valve body according to claim 1 wherein said first and second surfaces of said flange are substantially parallel.

3. A diaphragm valve body according to claim 1 wherein said second surface of said flange slopes away from said end portion exterior wall surfaces in a direction radially outward from said diaphragm passage axis.

References Cited by the Examiner

UNITED STATES PATENTS

| | | | |
|---|---|---|---|
| 1,093,868 | 4/1914 | Leighty | 285—367 X |
| 2,616,164 | 11/1952 | Tiedemann | 251—331 X |
| 2,953,346 | 9/1960 | Liecke | 251—331 X |
| 2,985,466 | 5/1961 | Solomon | 285—368 X |
| 3,067,764 | 12/1962 | Geary | 251—331 X |

FOREIGN PATENTS 521,336  5/1940  Great Britain.

ISADOR WEIL, *Primary Examiner.*

WILLIAM F. O'DEA, A. COHAN, *Examiners.*